No. 796,179. PATENTED AUG. 1, 1905.
A. BELDAM.
METALLIC PACKING.
APPLICATION FILED MAY 17, 1904.

2 SHEETS—SHEET 1.

Witnesses
N. M. Kuehne
Paul Nenhut

Inventor
Asplan Beldam
By Richards
ATTORNEYS

No. 796,179. PATENTED AUG. 1, 1905.
A. BELDAM.
METALLIC PACKING.
APPLICATION FILED MAY 17, 1904.

2 SHEETS—SHEET 2.

Witnesses

Inventor
Asplan Beldam

ATTORNEYS

UNITED STATES PATENT OFFICE.

ASPLAN BELDAM, OF BALDOCK, ENGLAND.

METALLIC PACKING.

No. 796,179.          Specification of Letters Patent.          Patented Aug. 1, 1905.

Application filed May 17, 1904. Serial No. 208,456.

*To all whom it may concern:*

Be it known that I, ASPLAN BELDAM, a subject of the King of England, and a resident of Baldock, in the county of Hertford, England, have invented certain new and useful Improvements in Metallic Packings, of which the following is a specification.

This invention has reference to metallic packings used in connection with engines, pumps, or machinery for making a tight joint between a moving part—say a rod or plunger—and a stationary part—namely, the cylinder cover or end or other part of the engine, pump, or machine in connection with which the rod or plunger works and from which it is desired to prevent the escape of fluid or into which the entrance of fluid is to be prevented.

The type of metallic packing which the invention more particularly concerns is that where the metallic rings are cut into a plurality of sections which are so cut away at their ends that when they are in place they just completely encircle the rod at their inside surface, while V-shaped spaces exist between the ends. This construction enables the segments of the rings to keep in contact with and follow the rod as they and it wear away. The segments are pressed up to the rod, plunger, or the like by springs. In packing of this kind, however, especially where the working fluid or fluid worked on is of high pressure, even although a plurality of such rings are employed with intermediate rings above and below to close these spaces at the top and bottom, leakage does sometimes take place by way of the gaps formed by these cut-away portions of the ring-segments; and the chief object and effect of the present invention is to prevent this.

According to this invention the rings, of which there may be several, are cut into segments with V-shaped spaces existing at the ends, and within each of these spaces a wedge-shaped piece is fitted which fills them, the angles at which the ends of the ring-segment and the filling-pieces are cut being such that will allow of the automatic adjustment of the packing onto the rod or other part and of its following up the wear as it takes place, and at the same time producing a steam-tight joint between the segment ends and the wedge-shaped filling-pieces.

This invention is illustrated in the annexed drawings, in which—

Figure 1:
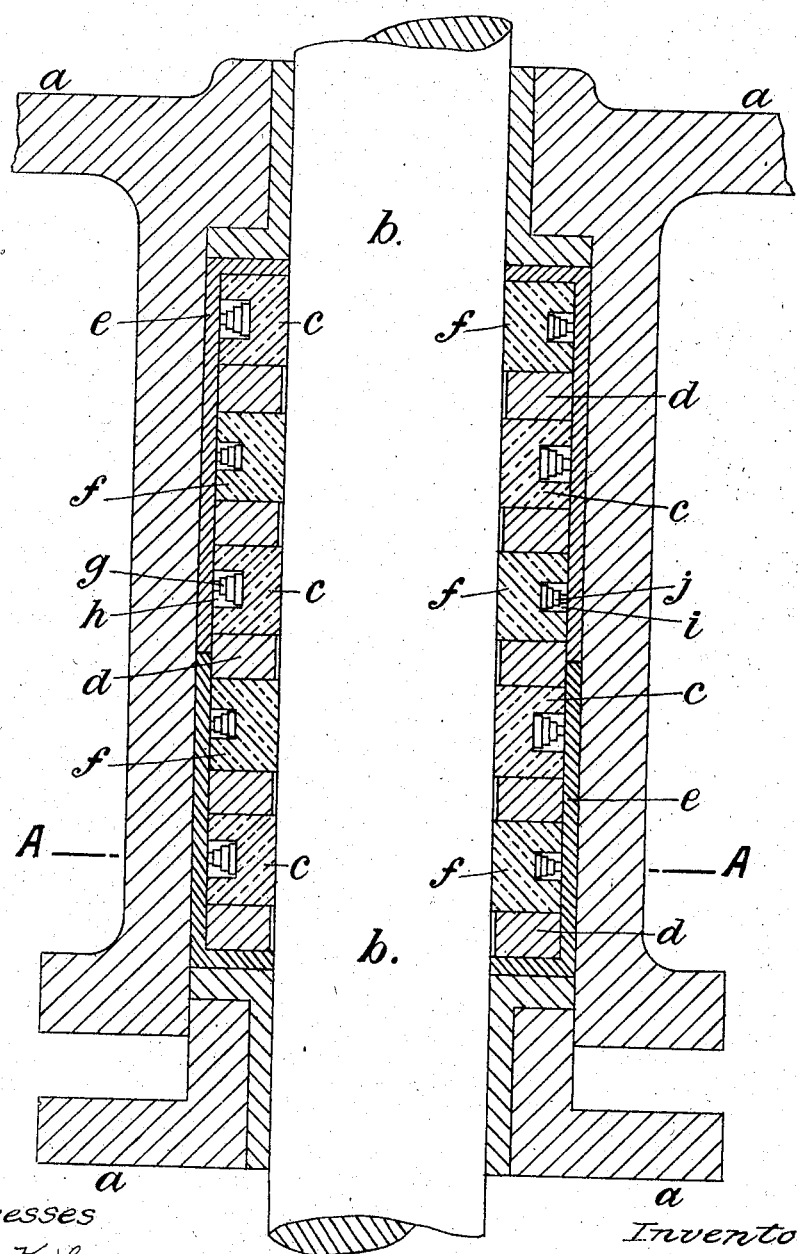
Figure 2:
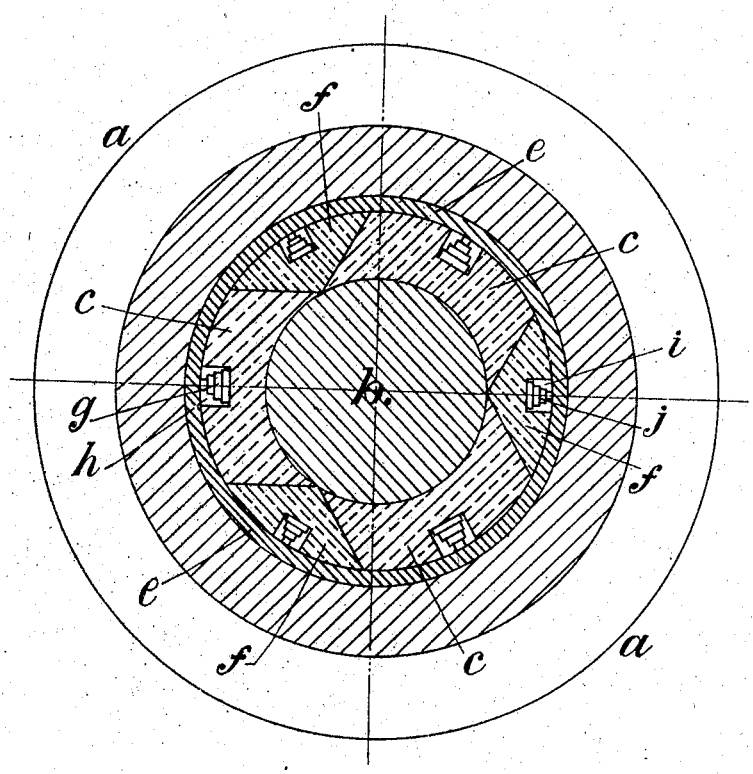
Figure 2:
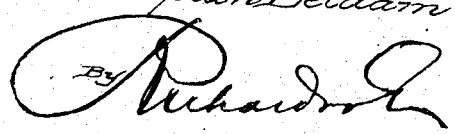

Figure 1 is a longitudinal section showing the packing fitted in a stuffing-box; and Fig. 2 is a cross-section of same, taken at the line A A.

Referring to the drawings, $a$ is the stuffing-box. $b$ is the rod. $c$ represents the packing-rings proper, made of ring-segments cut away at their ends and forming V-shaped spaces between them, and $d$ represents intermediate rings between each of the packing-rings $c$. The rings $c$ and $d$ are placed alternately in the case or box $e$, which is inserted into the stuffing-box of the engine or machine to be packed.

The wedge-shaped pieces, which according to this invention are used or employed to fill the V-shaped space between the ends of the ring-segments $c$, are designated $f$, and the angles of the segments $c$ and the corresponding angles of the wedge-shaped pieces $f$ are formed at the angle shown, which is one that will allow of the continuous automatic movement of the segments $c$ up to rod $b$ as they wear by the springs $g$, which are disposed within the chambers $h$ in the back of each of the segments, the springs being held and pressed by the inside of the case or box $e$. In the case illustrated in the drawings the wedge-shaped pieces are shown separate from the case or box $e$ and are provided with apertures or chambers $i$, with springs $j$ in them similar to the springs $g$ to press and keep them in place and against the ends of the segments, or they may be used without springs; but in many cases it would be preferred to have the wedge-shaped pieces $f$ attached to or formed on the inside of the box or case $e$. The box itself, moreover, may be made in halves or sections, the divisions being either taken or disposed vertically, circumferentially, or diagonally, according to the size of stuffing-box to be filled and to the nature of existing stuffing-boxes to which the packing is to be applied.

With regard to the wedge-shape pieces $f$, whether they be on the case or box or separate, this would depend upon the size of the packing and conditions of use or application of the invention and requirements of the case.

The intermediate rings $d$ between the rings $c$ serve as distance-rings and not packing-rings proper and may in some cases, if desired, be made in one with the casing $e$.

By this invention steam-tightness between the segment ends and the wedge-shaped filling-pieces $f$ is practically and reliably secured, and the whole packing automatically adjusts itself to the rod or plunger $b$ as wear takes place, the segments being pressed up to the rod, plunger, or the like by the spiral springs $g$.

It will be plain that the numbers of the segments $c$ and filling-pieces $f$ will vary according to the different purposes and sizes of packing.

Having now particularly described my invention, what I claim as new, and desire to secure by Letters Patent, is—

1. A metallic packing for making a tight joint between a moving part and a stationary part comprising metallic rings, each ring consisting of a number of sections having their ends inclined so as to form wedge-shaped spaces between the sections and wedge-shaped pieces $f$ fitting in said spaces said sections and pieces $f$ forming the complete ring, chambers formed in each section and piece $f$ and compressed springs placed in said chambers and adapted to force the sections and pieces $f$ toward the moving part.

2. A metallic packing for making a tight joint between a moving part and a stationary part comprising metallic rings, each ring consisting of a number of sections having their ends inclined so as to form wedge-shaped spaces between the sections and wedge-shaped pieces $f$ fitting in said spaces, said sections and pieces $f$ forming the complete ring, chambers formed in each section and piece $f$ and compressed springs placed in said chambers and adapted to force the sections and pieces $f$ toward the moving part, and rings $d$ placed between the metallic rings.

In witness whereof I have hereunto set my hand in presence of two witnesses.

ASPLAN BELDAM.

Witnesses:
    WALTER JOSEPH NORWOOD,
    THOMAS JOHN OSMAN.